US009492697B2

(12) United States Patent
Wilson et al.

(10) Patent No.: US 9,492,697 B2
(45) Date of Patent: *Nov. 15, 2016

(54) TISSUE DIGESTION METHOD

(75) Inventors: Joseph H. Wilson, Danville, IN (US); Lucas J. Wilson, Danville, IN (US)

(73) Assignee: Bio-Response Solutions, Inc., Danville, IN (US)

( * ) Notice: Subject to any disclaimer, the term of this patent is extended or adjusted under 35 U.S.C. 154(b) by 749 days.

This patent is subject to a terminal disclaimer.

(21) Appl. No.: 13/695,215

(22) PCT Filed: Apr. 29, 2011

(86) PCT No.: PCT/US2011/034576
§ 371 (c)(1),
(2), (4) Date: Mar. 29, 2013

(87) PCT Pub. No.: WO2011/137351
PCT Pub. Date: Nov. 3, 2011

(65) Prior Publication Data
US 2013/0178687 A1    Jul. 11, 2013

Related U.S. Application Data

(60) Provisional application No. 61/329,962, filed on Apr. 30, 2010.

(51) Int. Cl.
*A62D 3/36* (2007.01)
*B09B 3/00* (2006.01)
*B01J 19/28* (2006.01)
*A62D 101/20* (2007.01)

(52) U.S. Cl.
CPC .................. *A62D 3/36* (2013.01); *B01J 19/28* (2013.01); *B09B 3/00* (2013.01); *A62D 2101/20* (2013.01)

(58) Field of Classification Search
CPC ........................................................ A62D 3/36
USPC ....................................................... 588/318
See application file for complete search history.

(56) References Cited

U.S. PATENT DOCUMENTS

| 394,982 | A | 12/1888 | Hobson |
|---|---|---|---|
| 5,332,532 | A | 7/1994 | Kaye et al. |
| 5,534,162 | A | 7/1996 | Adams et al. |
| 6,437,211 | B2 | 8/2002 | Kaye et al. |
| 6,472,580 | B2 | 10/2002 | Kaye et al. |
| 7,183,453 | B2 | 2/2007 | Wilson et al. |
| 7,829,755 | B2 | 11/2010 | Wilson et al. |
| 7,910,788 | B2 | 3/2011 | Wilson et al. |
| 2001/0009969 | A1 | 7/2001 | Kaye et al. |
| 2001/0053869 | A1 | 12/2001 | Kaye et al. |
| 2003/0040651 | A1 | 2/2003 | Wilson et al. |
| 2004/0018112 | A1 | 1/2004 | Wilson et al. |
| 2004/0123637 | A1 | 7/2004 | Rostrom |
| 2006/0247485 | A1 | 11/2006 | Wilson et al. |
| 2007/0038013 | A1 | 2/2007 | Wilson et al. |
| 2007/0197852 | A1 | 8/2007 | Wilson et al. |
| 2009/0004714 | A1 | 1/2009 | Norholm et al. |
| 2009/0137858 | A1 | 5/2009 | Wilson et al. |
| 2011/0040138 | A1 | 2/2011 | Wilson et al. |
| 2011/0171073 | A1 | 7/2011 | Wilson et al. |
| 2013/0053615 | A1 | 2/2013 | Wilson et al. |

FOREIGN PATENT DOCUMENTS

| AU | 2011245166 | 11/2014 |
|---|---|---|
| EP | 0936925 | 4/2009 |
| IN | 206718 | 3/2006 |
| JP | 10-028958 | 2/1998 |
| JP | 10-034118 | 2/1998 |
| JP | 2006-175310 | 7/2006 |
| JP | 2006-507940 | 9/2006 |
| WO | 9414169 | 6/1994 |
| WO | 9739777 | 10/1997 |
| WO | 0152907 | 7/2001 |
| WO | 02102420 | 12/2002 |
| WO | 2004091820 | 10/2004 |
| WO | 2006049625 | 5/2006 |
| WO | 2011137351 | 11/2011 |

OTHER PUBLICATIONS

PCT Application No. PCT/US2011/034576, International Search Report and Written Opinion Jan. 11, 2012.
PCT Application No. PCT/US2011/034576, International Preliminary Report on Patentability Apr. 2, 2013.
Japanese Patent Application No. 2013-508285, Office Action Sep. 2, 2014.
U.S. Appl. No. 13/594,536, Office Action Jun. 24, 2014.
U.S. Appl. No. 13/594,536, Response to Office Action Dec. 24, 2014.
Australian Patent Application No. 2011245166 (Australian counterpart to U.S. Appl. No. 13/695,215), Notice of Acceptance/Allowance and Accepted Specification Apr. 29, 2014.
U.S. Appl. No. 13/594,536, Notice of Allowance Jan. 15, 2015.
Chinese Patent Application No. 201180032228.3, Office Action Apr. 20, 2014.

(Continued)

*Primary Examiner* — Edward Johnson
(74) *Attorney, Agent, or Firm* — Daniel L. Boots; Brian W. Chellgren; Bingham Greenebaum Doll LLP

(57) ABSTRACT

Tissue digestion methods and apparatuses that provide easy, safe and inexpensive disposal of biological tissue, for example animal carcasses and human cadavers, are disclosed. Embodiments include tissue digesters with elongated cylindrical vessels for holding digestive fluid and baskets for holding tissue within said vessel. Embodiments include baskets with perforations to allow circulation of digestive fluid around and about the tissue. In one form the basket holding the tissue is horizontally loaded into a horizontally disposed vessel. The vessel is then tilted to a more vertical orientation. Gravity helps to collect the tissue fragments in a sloped collection region of the basket, which is located near a mixer to allow continual agitation of the tissue fragments as they are digested. The tissue digester can operate efficiently at lower temperature and pressures, is mechanically less complicated, consumes less power and is less expensive to manufacture than conventional tissue digesting systems.

11 Claims, 19 Drawing Sheets

(56) References Cited

OTHER PUBLICATIONS

Chinese Patent Application No. 201180032228.3, Office Action Jan. 14, 2015.
Chinese Patent Application No. 201180032228.3, Response to Office Action Sep. 15, 2014.
Chinese Patent Application No. 201180032228.3, Response to Office Action Mar. 30, 2015.
Japanese Patent Application No. 2013-508285, Response to Office Action Jan. 27, 2015.
European Patent Application No. 11775635.3, Search Report Jan. 5, 2015.
Chinese Patent Application No. 201180032228.3, Office Action Jul. 14, 2015.
Japanese Patent Application No. 2013-508285, Office Action Jul. 28, 2015.
Japanese Patent Application No. 2013-508285, Response to Office Action Oct. 23, 2015.
European Patent Application No. 11775635.3, Response to Office Action Nov. 23, 2015.
Chinese Patent Application No. 201180032228.3, Response to Office Action Sep. 28, 2015.

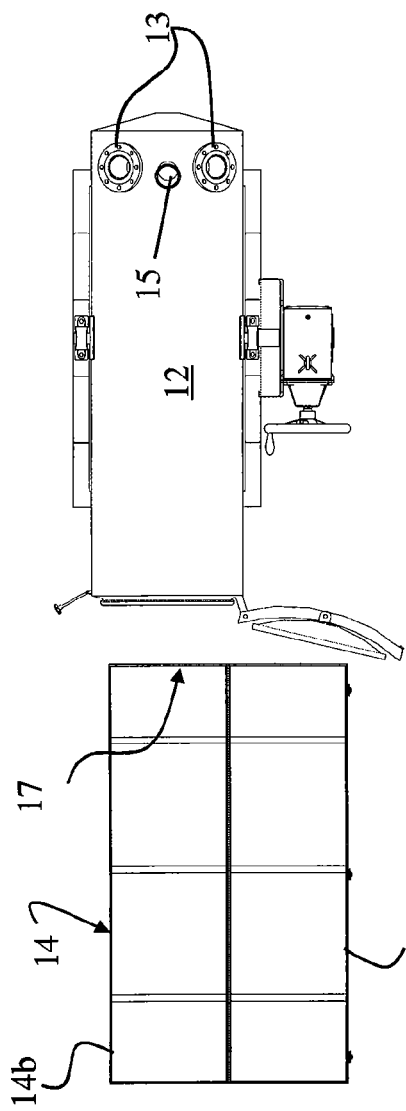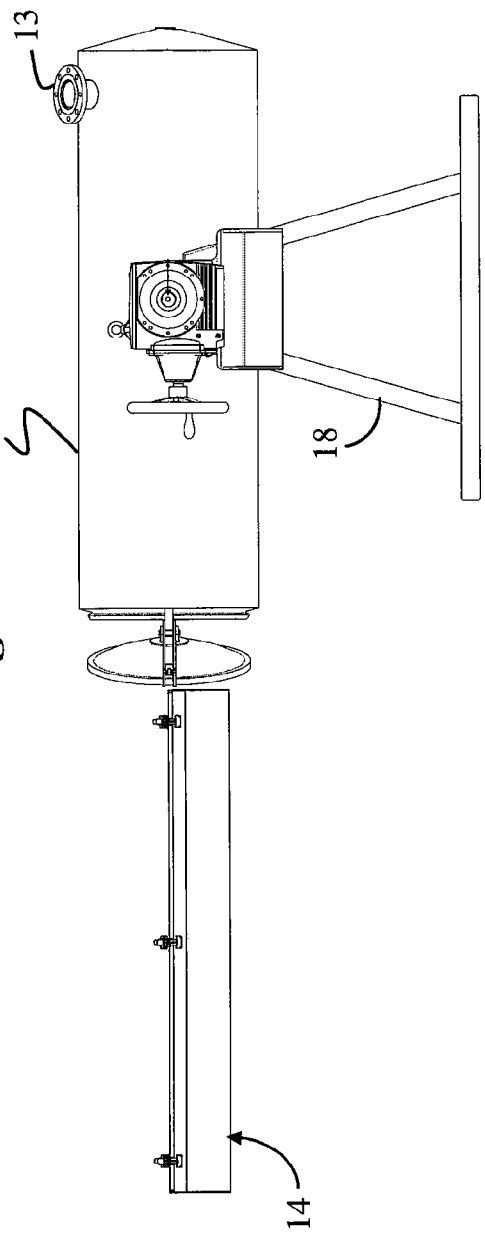
Fig. 4B
Fig. 4A

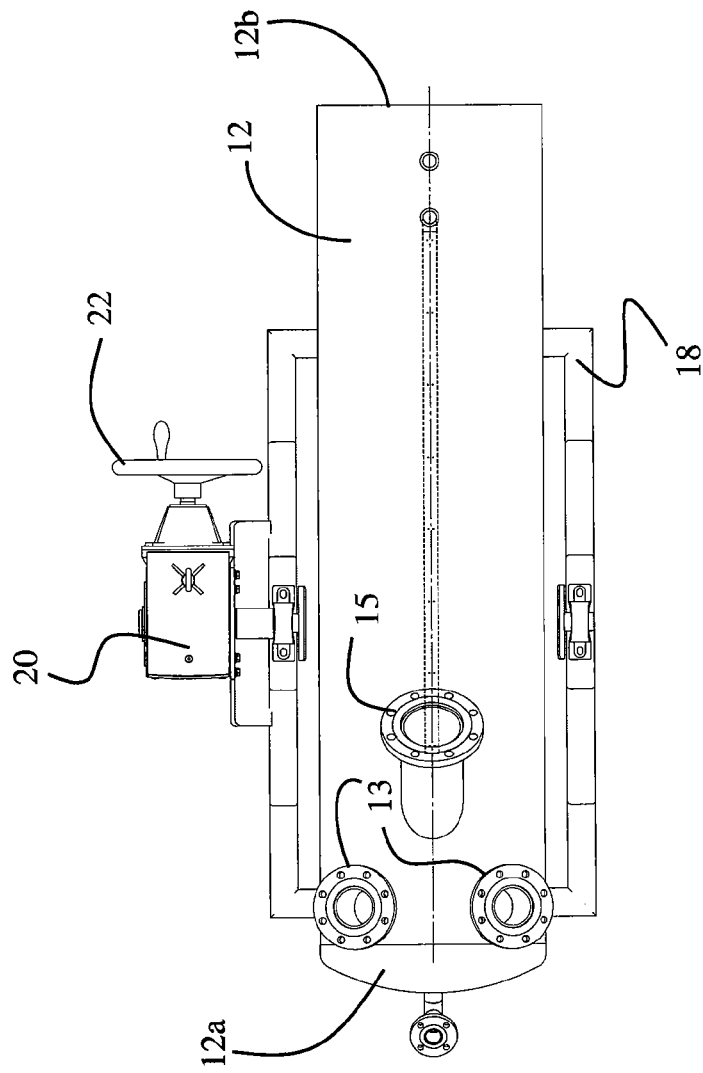
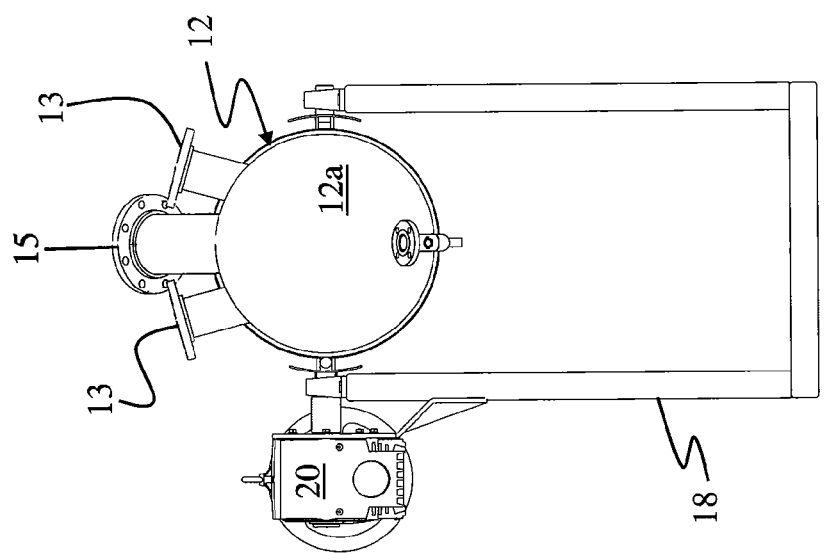
*Fig. 5D*
*Fig. 5C*

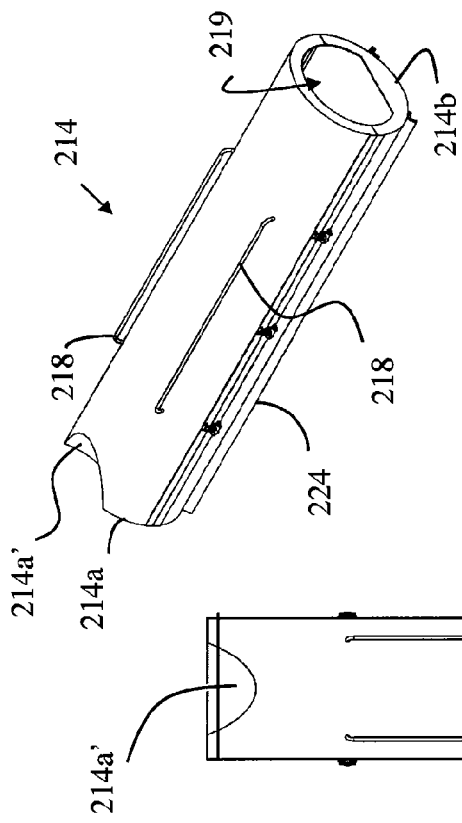
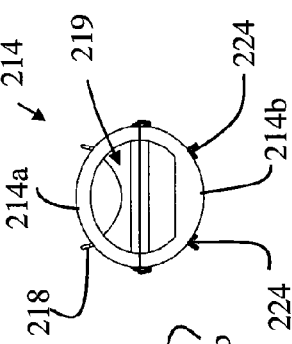
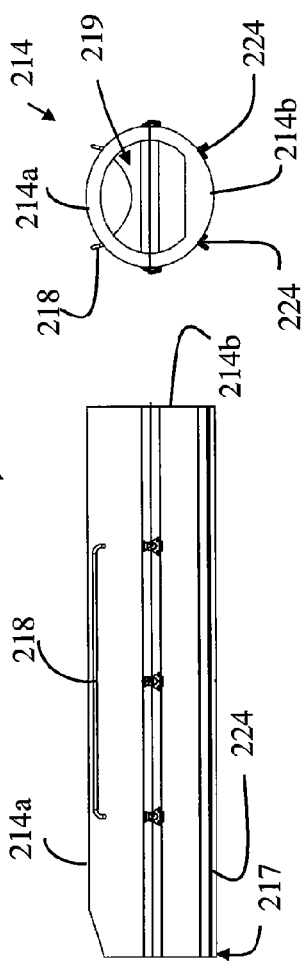
Fig. 18A
Fig. 18B
Fig. 18C
Fig. 18D

TISSUE DIGESTION METHOD

This application claims the benefit of U.S. Provisional Application No. 61/329,962, filed Apr. 30, 2010, the entirety of which is hereby incorporated herein by reference.

FIELD

Embodiments of this invention relate to tissue digestion and, more particularly, to a system for quickly and safely digesting human and animal tissue.

BACKGROUND

Many institutions generate organic waste that requires proper disposal. For example, businesses operations involving livestock frequently require disposal of dead, and possibly diseased, carcasses. Other examples include hospitals, morgues, mortuaries, and funeral homes that will have human remains that require proper disposition. For many years burial and incineration (cremation) were the primary manners in which such tissue was disposed. In recent years tissue digesters have been increasingly used as an alternative to burial or incineration for the orderly disposition of tissue. Alkaline hydrolysis, which exposes the tissue to a strong alkaline (or base) solution, is a process used in many tissue digesters. Most of the tissue is digested (dissolved) in the tissue digesters, and the dissolved tissue is then typically considered safe to discharge into the environment. A small percentage remains undigested at the end of the process (approximately only five percent of the original weight and volume of a carcass or cadaver is comprised of the mineral ash of the bones and teeth), but is sterile and easily crushed into a powder that may be used as a soil additive or presented to the family in an urn in much the same way as ash from a crematory.

SUMMARY

Embodiments of the present invention provide improved tissue digestion methods and apparatuses.

In accordance with one preferred embodiment of the present invention, a tissue digester that digests tissue (e.g., carcasses and/or cadavers) while being tilted in a non-vertical and non-horizontal orientation is disclosed.

In accordance with another preferred embodiment of the present invention, a tissue digester into which carcasses and/or cadavers may be easily loaded is disclosed. At least one embodiment tissue digester tilts from a horizontally disposed tissue-loading position, which facilitates easy loading of tissue (carcass, cadaver, etc.) into the tissue digester, to a more upright tissue-digesting position. A preferred embodiment includes a basket or case that holds the tissue and is inserted horizontally into a liquid holding vessel. When the vessel is tilted, example embodiments include baskets or cages shaped to funnel tissue fragments that are not completely digested downwardly near an agitator to speed digestion. In still other embodiments the basket and vessel engage one another to permit longitudinal insertion (and removal) of the basket into (and from) the vessel while inhibiting other movement of the basket with respect to the vessel to, for example, prevent rotation and tipping of the basket while within the vessel.

In accordance with another aspect of preferred embodiments of the present invention, a tissue digester capable of operating at temperatures and/or pressures much lower than conventional tissue digesters while digesting tissue as completely as conventional digesters is disclosed. At least one embodiment tissue digester operates at atmospheric pressure and/or at an approximate temperature of 200 degrees F. The operation of these tissue digesters at decreased temperatures and/or pressures creates an operating environment that is inherently safer and is generally subject to less government regulation than traditional high-temperature and/or high-pressure digesters.

In accordance with still another aspect of preferred embodiments of the present invention, a tissue digester that is less complicated and less expensive to both manufacture and operate is disclosed. At least one embodiment tissue digester consumes considerably less power than traditional tissue digesters. Another embodiment includes a tissue digester that does not require special power requirements and may be connected to conventional power supplies that come into most businesses and residences.

In accordance with yet another aspect of preferred embodiments of the present invention, a tissue digester with agitators that do not require liquid pumps or immersed seals is disclosed. At least one embodiment includes a propeller-driven mixer, which is not as failure-prone as traditional digesters using circulation pumps and mixing jets.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein. The various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 4A is a side elevational view of the tissue digester assembly depicted in FIG. 1 with the basket assembly open.

FIG. 4B is a top plan view of the tissue digester assembly depicted in FIG. 4A.

FIG. 5C is a rear elevational view of the tissue digester assembly depicted in FIG. 5A.

FIG. 5D is a top plan view of the tissue digester assembly depicted in FIG. 5A.

FIGS. 18A-18D present perspective and elevational views of the basket depicted in FIG. 14.

DETAILED DESCRIPTION OF THE ILLUSTRATED EMBODIMENTS

Figure 1:
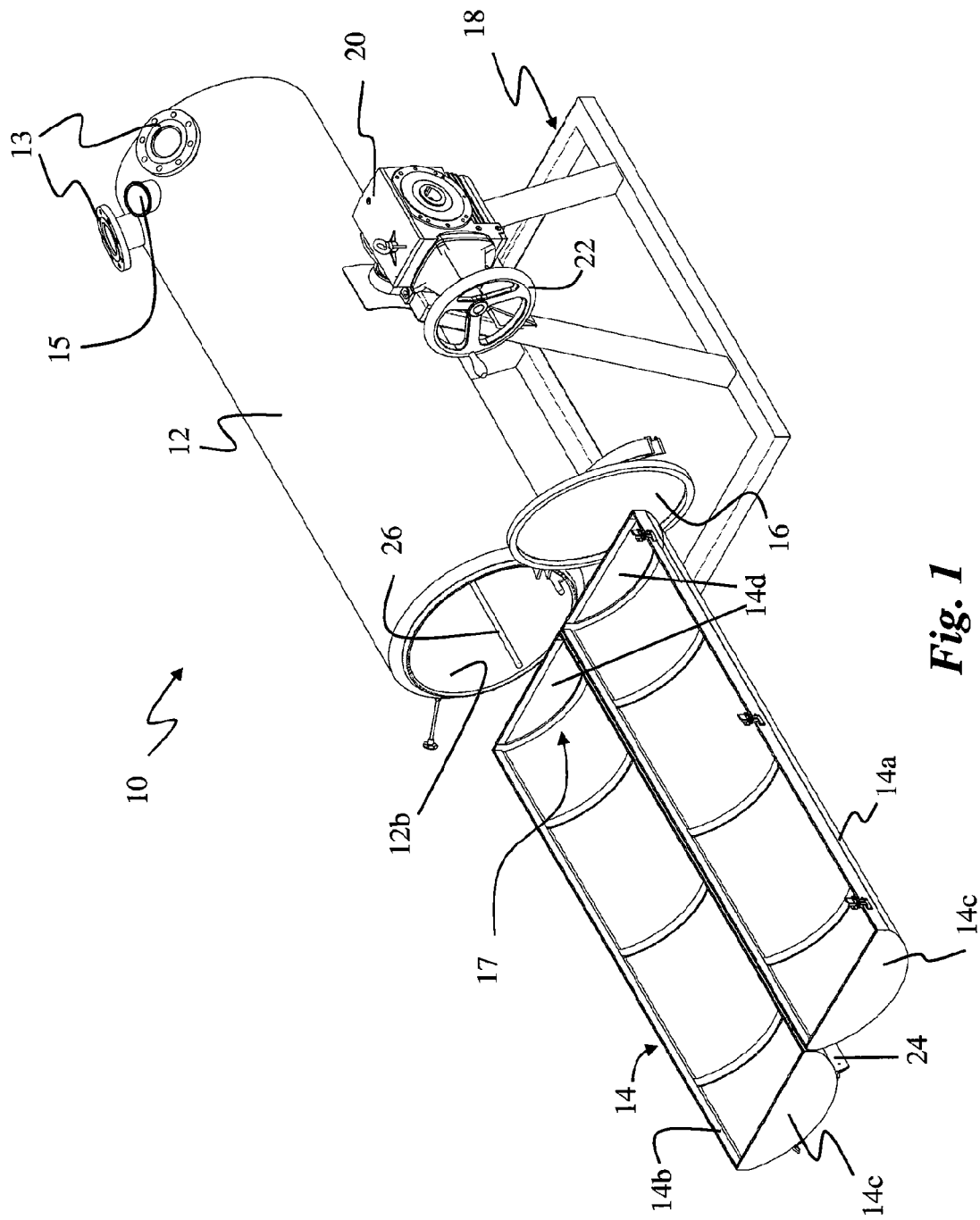
FIG. 1 is a perspective view of a tissue digester assembly according to one preferred embodiment of the present invention shown in the loading position.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "the invention" herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Although specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter are presented as examples only and do not limit the applicability of other compositions of matter, especially other compositions of matter with similar properties, unless otherwise specifically indicated.

Tissue digestion methods and apparatuses that provide easy, safe and inexpensive disposal of biological tissue, for example animal carcasses and human cadavers, are disclosed. Embodiments include tissue digesters with elongated cylindrical vessels for holding digestive fluid and baskets for holding tissue within said vessel. Embodiments include baskets with perforations to allow circulation of digestive fluid around and about the tissue. In one form the basket holding the tissue is horizontally loaded into a horizontally disposed vessel. The vessel is then tilted to a more vertical orientation. Gravity helps to collect the tissue fragments in a sloped collection region of the basket, which is located near a mixer to allow continual agitation of the tissue fragments as they are digested. The tissue digester can operate efficiently at lower temperature and pressures, is mechanically less complicated, consumes less power and is less expensive to manufacture than conventional tissue digesting systems. At higher temperatures employed in a pressure vessel provided by this invention, the tilting mechanism also dramatically improves the efficiency of the process and the completeness of the tissue digestion.

One preferred embodiment of the present invention includes a vessel (also referred to as a container) that tilts for the digestion of tissue. A perforated basket or cage holds the tissue. To load tissue into the tiltable vessel, the vessel is disposed in a generally horizontal position or orientation and the cage or basket containing the tissue is moved horizontally into the vessel. This allows for easy loading of the tissue, which may weigh several hundred pounds or more, into the vessel. Once the cage with its tissue has been inserted into the vessel, the vessel is then closed and tilted. The alkali may be added manually as dry powder prior to closing the vessel, or it may be added automatically as a liquid after the vessel has been tilted into position. In operation, gravity moves the tissue toward the digestion (lower) end of the vessel. Tissue not initially immersed in the digestive liquid when the vessel is in the tilted position progressively moves downward toward the digestive end as the immersed tissue is digested. Heat, and/or agitation, may be applied to the digestive liquid to accelerate the digestive process. After digestion, the liquid is drained and the vessel is tilted back to a substantially horizontal orientation to facilitate easy removal of the basket or cage.

Figure 2:
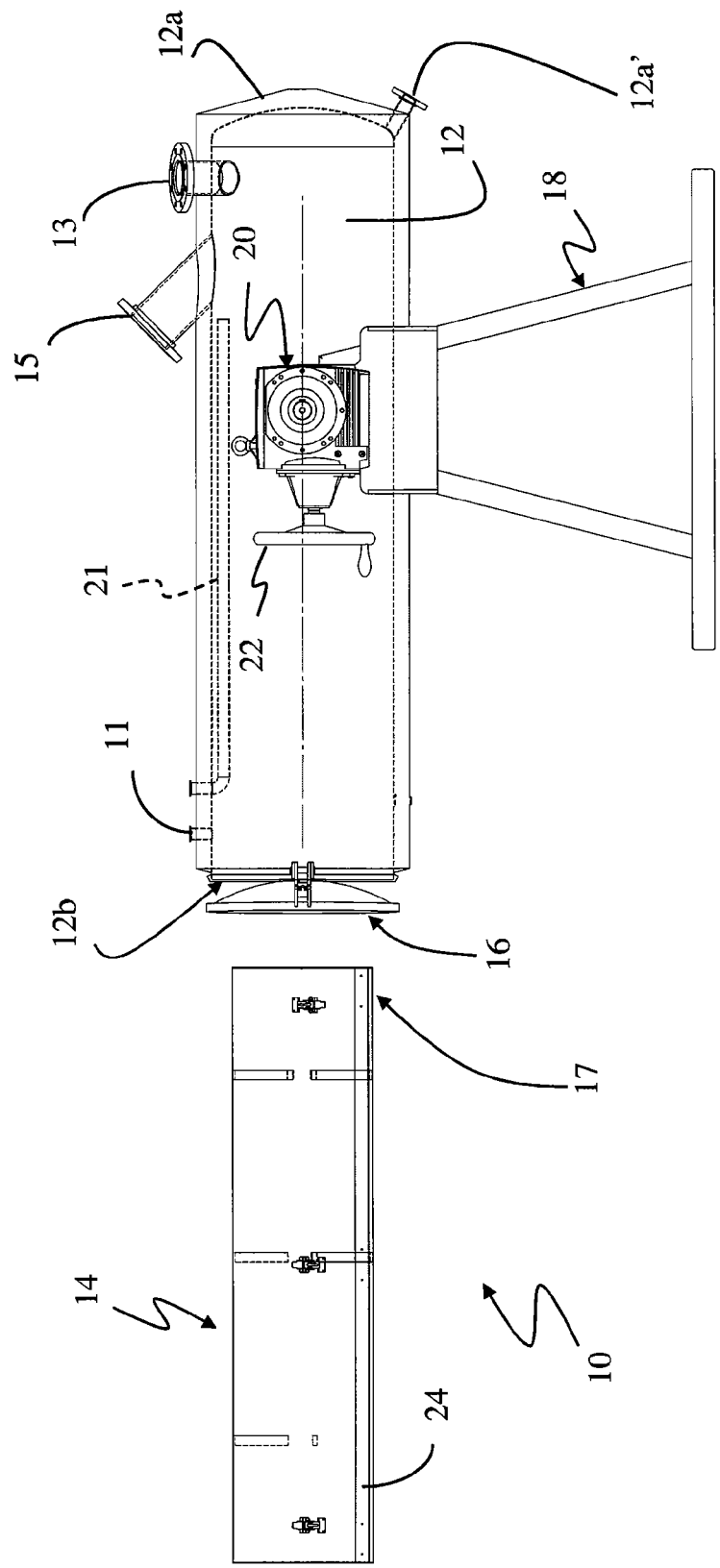
FIG. 2 is a side elevational view of the tissue digester assembly depicted in FIG. 1.

The assembly and process provided by this invention digests human and animal tissue utilizing, for example, alkaline hydrolysis to achieve the desired objective. As shown in FIGS. 1-6 and 8-10, one embodiment of the tissue digester assembly 10 comprises a vessel 12 carrying a cage or basket 14 that may be arranged removably within the vessel. FIG. 1 shows a perspective view of the vessel-and-basket assembly with the basket in the open position, while FIG. 2 shows a side view of the same assembly with the basket in a closed position. Although the depiction of basket 14 in FIGS. 1-4 do not show perforations, it is to be understood that basket 14 includes one or more perforations through which the digestive liquid can flow. In one embodiment, basket 14 contains multiple perforations and resembles a wire cage.

The vessel 12 is preferably generally cylindrical in shape with a longitudinal axis and two ends. Vessel 12 is optionally elongated. While the vessel is in the tilted position, tissue digestion occurs in a portion that holds digestive liquid, for example closed end 12a of vessel 12. Tissue is typically inserted through the second opposing end, for example through open insertion end 12b. The open end 12b may be closed by a door or cover 16. Vessel 12 is supported upon a support member, such as frame 18, and optionally pivots or tilts with respect to the support member and may be moved into a titled position by way of gear box 20, which may be electric-powered or operated manually via turn handle 22.

Vessel 12 preferably includes at least one port 13 arranged adjacent the closed end 12a of the vessel through which one or more heating units may extend into the interior of vessel 12. A preferred embodiment includes two such ports 13 and two corresponding heating units. At least one port 15 may also be provided adjacent the closed end 12a of the vessel to carry a mixing unit (also referred to herein sometimes as an "agitator").

Basket 14 includes an upper lid portion 14a and bottom portion 14b. The basket 14 and vessel 12 are preferably of sufficient length to receive a human body or other bodies or carcasses to be digested. The end 14d of basket 14, which is enclosed by the digesting end of vessel 12 (closed end 12a of vessel 12 in the illustrated embodiment), is typically closed to prevent pieces of tissue larger than the perforations from circulating outside basket 14. Basket 14 is preferably constructed from perforated stainless steel. In one embodiment, basket 14 and vessel 12 can hold at least 350 pounds of tissue (24" vessel and 22" basket), for example whole carcasses and cadavers. In another embodiment, basket 14 and vessel 12 can hold nearly 500 pounds of tissue (27" vessel and 25" basket). In still another embodiment, basket 14 and vessel 12 can hold over 600 pounds of tissue (30" vessel and 28" basket). While ¼-inch perforations (holes) in the basket 14 are preferred, the perforations can range from smaller holes to much larger holes, including the basket being constructed from a wire frame or wedgewire. Bottom portion 14b of basket 14 is preferably made stronger than upper lid portion 14a because it may be used to collect and transport human cadavers and/or animal carcasses.

Basket 14 is preferably provided with loading members, for example rails or abutments 24, that facilitate the basket being moved into and removed from the interior of the vessel 12. The loading members can also serve to space basket 14 from the interior sides of vessel 12 a selected distance, in order to facilitate flow of the digestive fluid around and through basket 14 when basket 14 is positioned within vessel 12. In one embodiment, rails 24 include low friction members, for example portions coated with Teflon® (manufactured by E. I. du Pont de Nemours and Company), that preferably do not adversely react with and affect the digestive process. Rails 24 extend outward a short distance from bottom portion 14b of the basket 14, and preferably extend in a radial direction from bottom portion 14b. Rails 24 may extend either partially or entirely along the longitudinal length of basket 14. Alternate embodiments include loading members that are easily moved, such as loading members that include wheels or other like means.

FIGS. 18A-D depict a basket 214 according to another embodiment of the present invention. Basket 214 is similar to basket 14 and operably interacts with vessel 12 in a manner similar to basket 14 except as otherwise stated. Basket 214 includes upper lid portion 214a and bottom portion 214b. The end of basket 214 that is enclosed by the digesting end of vessel 12 (closed end 12a of vessel 12 in the illustrated embodiment) is closed to prevent pieces of tissue larger than the perforations from circulating outside basket 214. The end of basket 214 that is enclosed by the other end of vessel 12 (open end 12b of vessel 12 in the illustrated embodiment) optionally includes an open portion 219 through which alkali may be inserted after basket 214 has been inserted into the vessel. Basket 214 optionally includes loading members, for example rails 224, that are similar to rails 24 described above.

Basket 214 may include portions that accommodate various internal structures, such as heating units 30 and agitators (e.g., shaft 34 and one or more propellers 36) within vessel 212. For example, in the illustrated embodiment shown in FIGS. 18A-18D, lid 214a of basket 214 includes concave portion 214a' to provide clearance for propeller shaft 34 of mixer 32.

Figure 5A:
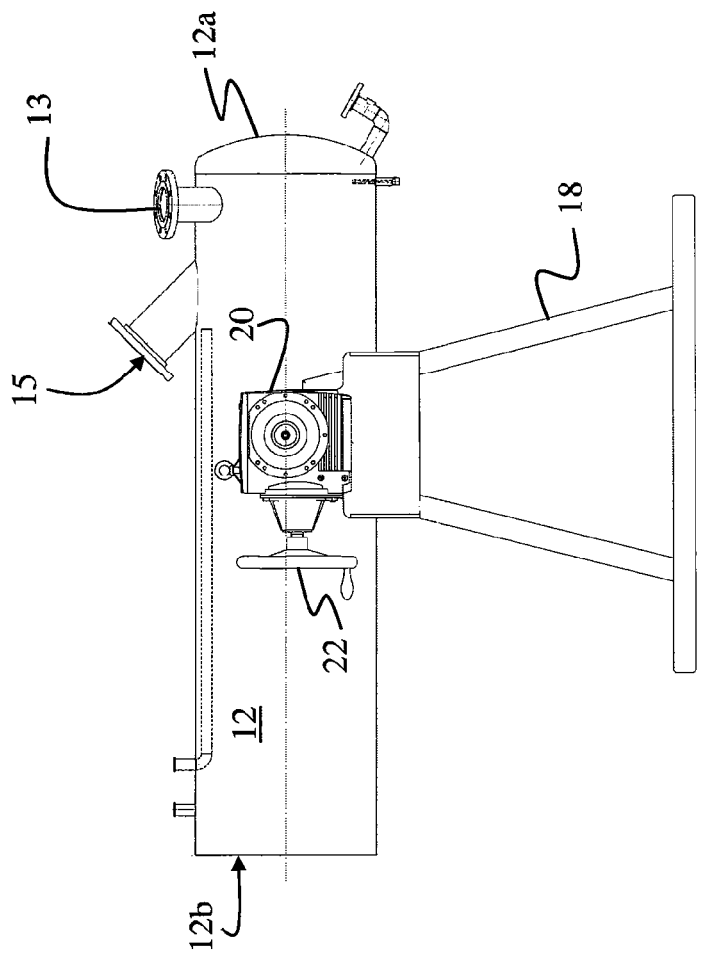
FIG. 5A is a side elevational view of the tissue digester assembly depicted in FIG. 1 without the basket and door assemblies.
Figure 5B:
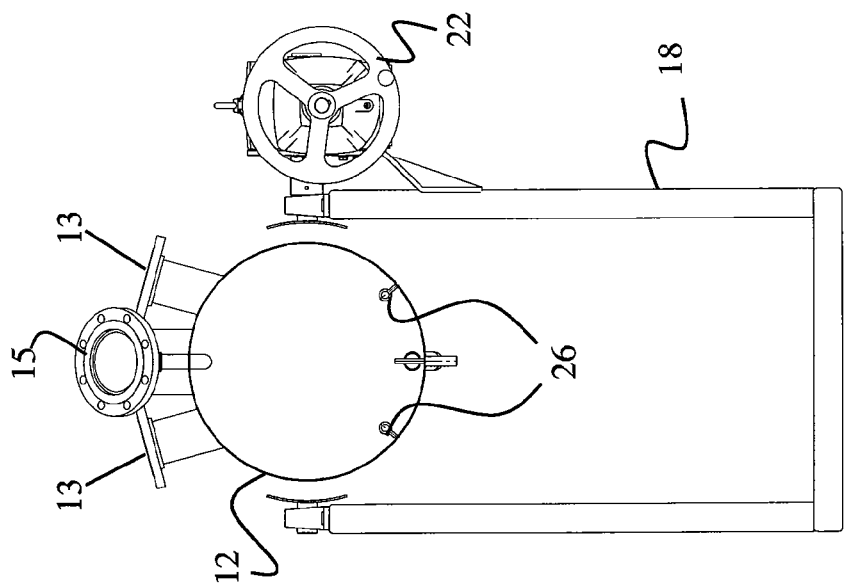
FIG. 5B is a front elevational view of the tissue digester assembly depicted in FIG. 5A.

Abutments or shelves 26 are optionally included within the interior of vessel 12 and can extend along the entire length, or a partial length, of the interior of vessel 12 as shown best in FIGS. 1 and 5B. Shelves 26 can engage rails 24 to inhibit non-longitudinal movement of basket 14 within vessel 12 while permitting the longitudinal movement of basket 14 within vessel 12 during insertion and removal. For example, in the illustrated embodiment, shelves 26 are adjacent to and outboard of (i.e., shelves 26 embrace rails 24 between shelves 26) rails 24 when basket 14 is inserted into vessel 12. As such, shelves 26 and rails 24 inhibit basket 14 from rotating (spinning) while within vessel 12. This arrangement of shelves 26 and rails 24 also inhibits basket 14 from tipping further than vessel 12 as the open end 12b of vessel 12 is rotated upward during operation.

Alternate preferred embodiments include a platform or dolly to support basket 14 and the tissue while basket 14 is being inserted into vessel 12. In some embodiments, the platform can be lowered to allow easy loading of a carcass or cadaver into basket 14, and raised to an appropriate height to allow easy loading of basket 14 into vessel 12. In other embodiments, the platform includes wheels or similar devise to allow easy movement of the platform.

Figure 6:
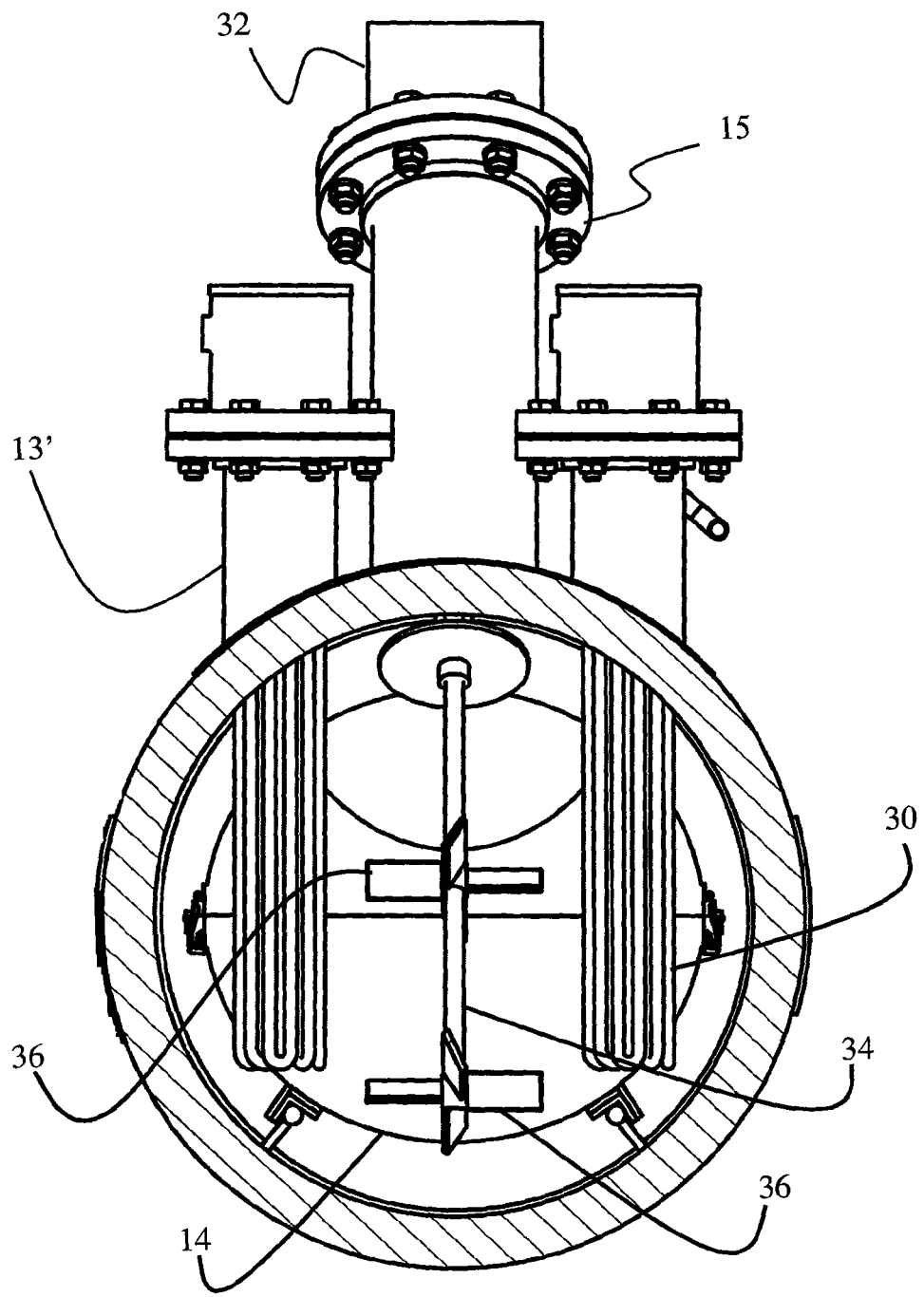
FIG. 6 is a partial sectional view of the tissue digestion assembly of FIG. 1 with mixing and heating means coupled to the assembly according to a preferred embodiment of the present invention.

Depicted in FIG. 6 is the tissue digesting assembly depicted in FIGS. 1-5 with mixing and heating means connected and with ports 13' (which are angled differently from the ports 13 depicted in FIGS. 1-5) according to one preferred embodiment of the present invention. Ports 13' in FIG. 6 are approximately parallel to one another while the ports 13 depicted in FIG. 5B are angled toward one another. In FIG. 6, one heating unit 30 is inserted through each port 13' and extends into the interior of vessel 12. A mixing unit 32 is inserted through port 15 and likewise extends into the interior of vessel 12. Mixing unit 32 includes a shaft 34 extending downwardly into the interior of vessel 12 and at least one mixing propeller, for example mixing propellers 36, arranged at the distal end of shaft 34. A preferred design of vessel 12 includes arranging the heating unit(s) from the top of vessel 12 in order to keep solid residues from forming around the bases of the heating unit(s), which can lead to the premature failure (i.e., burn out) of the heating units.

Figure 7:
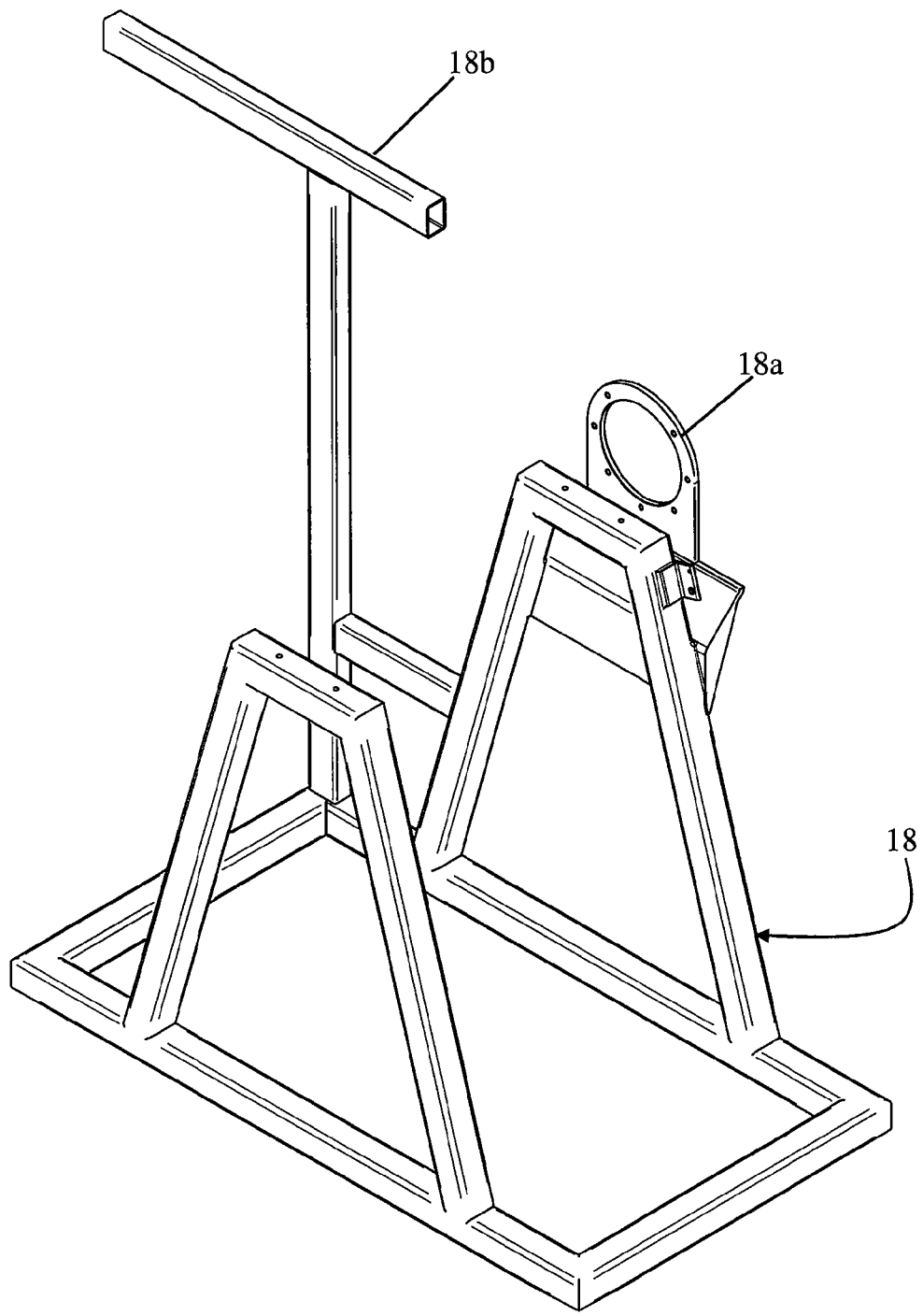
FIG. 7 is a perspective view of the frame portion of the tissue digesting assembly depicted in FIG. 1.

Depicted in FIG. 7 is frame 18 according to one embodiment of the present invention. Frame 18 is positioned on a support surface and is pivotally attached to vessel 12. Frame 18 also includes a bracket 18a for mounting gear box 20 and a member 18b for mounting a control panel. Although frame 18 is depicted in FIGS. 1-5 as being pivotally attached to vessel 12 at a location near the midpoint between ends 12a and 12b, other embodiments include frame 18 being pivotally attached to vessel 12 at other positions, such as adjacent end 12a. Frame 18 optionally includes members, such as wheels, that allow frame 18 to be easily moved, or load cells to allow for automated weight measurement and liquid alkali injection.

With vessel 12 in a tissue loading position, basket 14 is removed from the vessel 12 and tissue, for example, human cadavers and/or animal carcasses, are placed into the basket 14. In the tissue loading position, vessel 12 may be horizontal or substantially horizontal as depicted in FIG. 1, or vessel 12 may be inclined. Basket 14 is then inserted into the vessel with the concave portion 14a' first so that the concave portion 14a' is adjacent closed end 12a of the vessel 12 when the basket 14 is positioned within the vessel 12. The digestive chemical, for example dry alkali flake, may then introduced into the interior of vessel 12 in powder form inserted through the open end of the upper basket portion 14a. A suitable alkali is 90% anhydrous potassium hydroxide (KOH) or a liquid 45% solution. Another suitable alkali is sodium hydroxide (NaOH) in 98% anhydrous flake form or a liquid 50% solution. In the preferred embodiment, a mix of the two alkali's is added. If liquid alkali is used, it is added via pump after the vessel door is closed and the vessel tilted.

Figure 8:
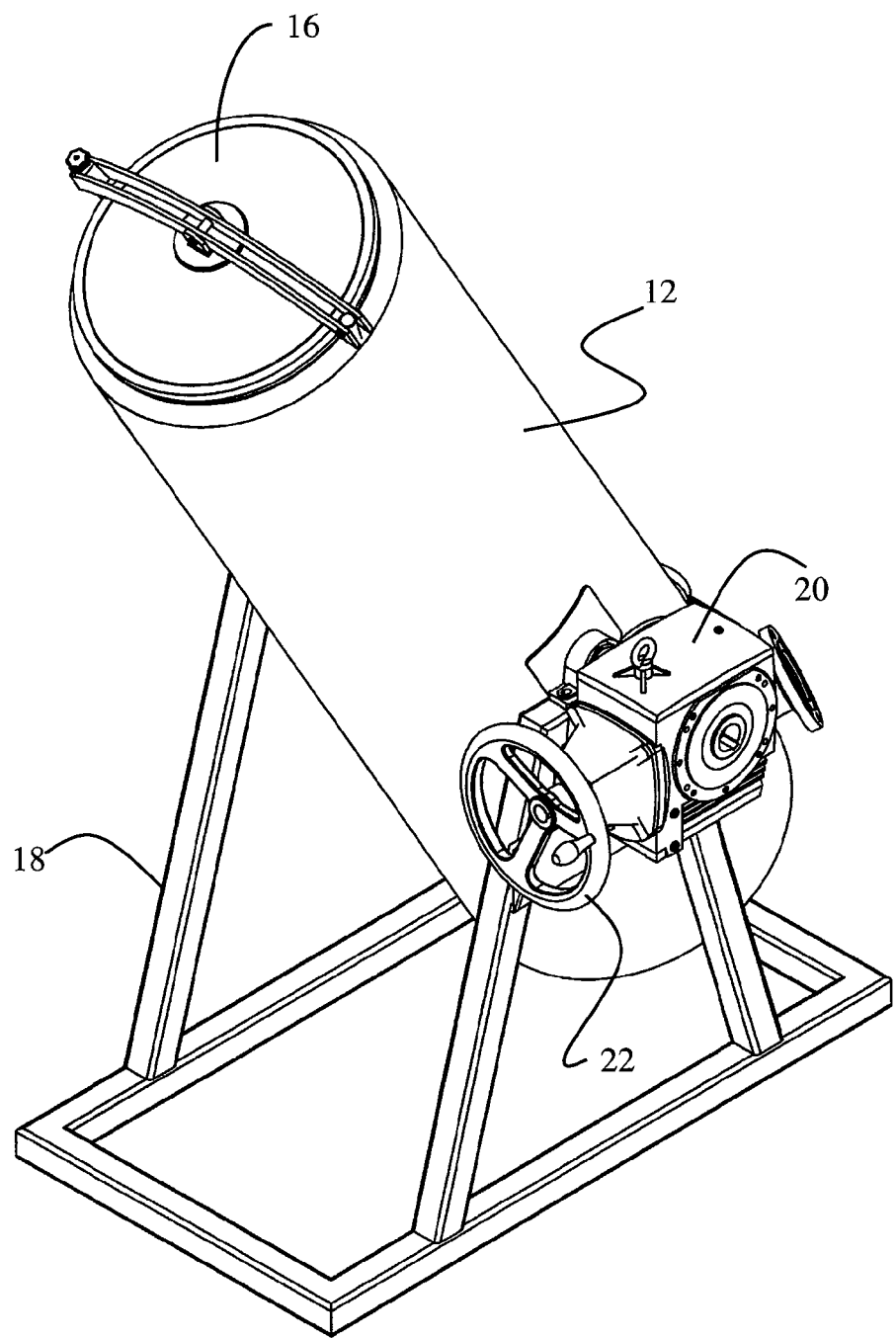
FIG. 8 is a perspective view of the tissue digester assembly depicted in FIG. 1 tilted to a tissue-digesting position.
Figure 9:
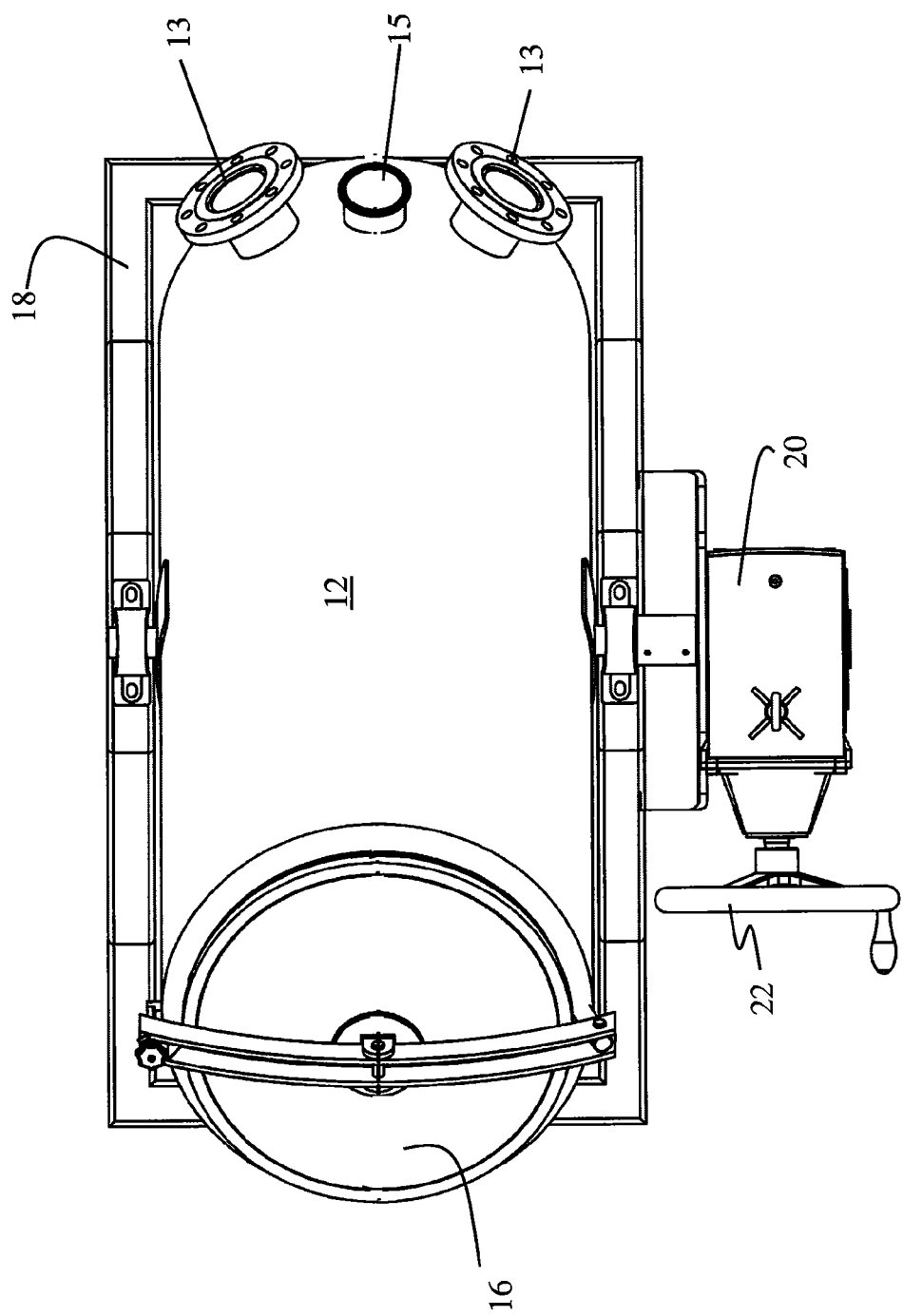
FIG. 9 is a top plan view of the tissue digester assembly depicted in FIG. 8.
Figure 12B:
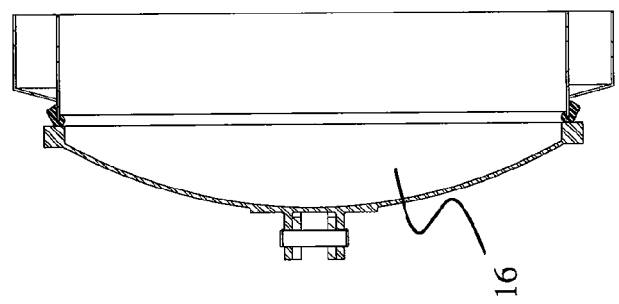
FIGS. 12A-12C present elevational, plan and sectional views of the cover and cross arm assemblies depicted in FIG. 1.
Figure 12C:
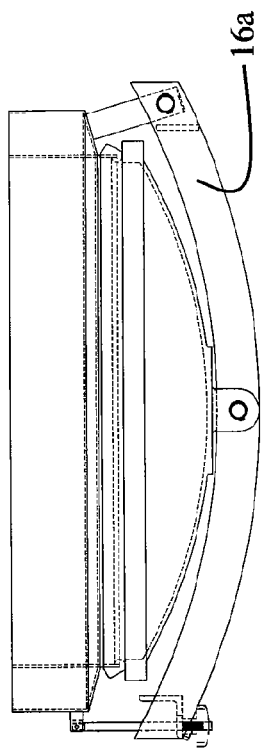
Figure 12A:
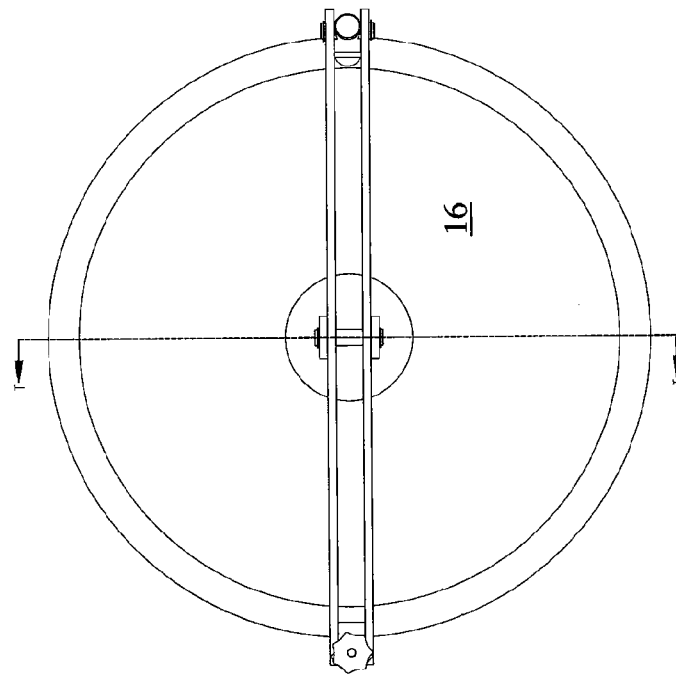
Figure 13C:
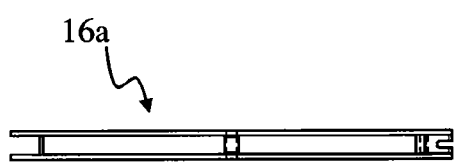
FIGS. 13A-13D present perspective, plan and elevational views of the cross arm assembly depicted in FIG. 1.
Figure 13D:
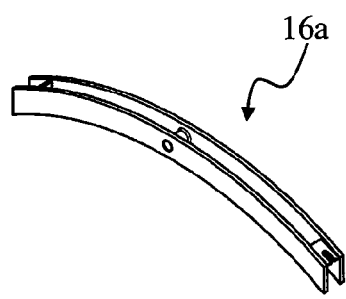
Figure 13A:
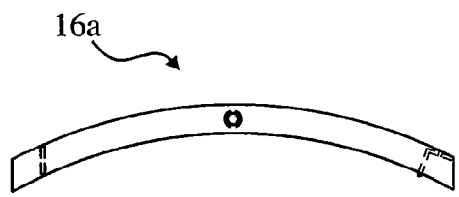
Figure 13B:
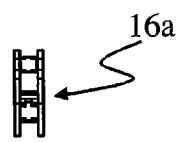
Figure 14:
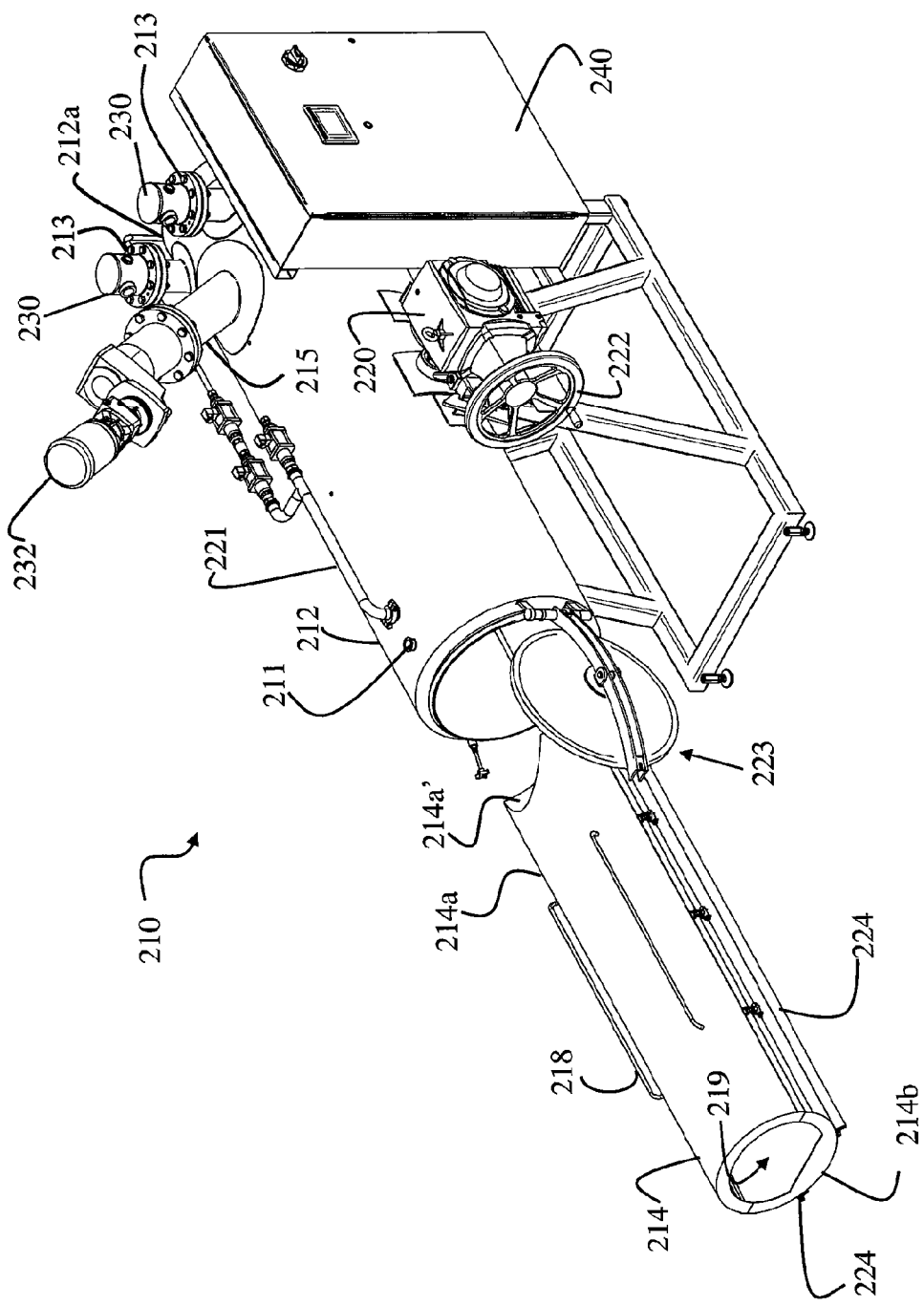
FIG. 14 is a perspective view of a tissue digester assembly according to another preferred embodiment of the present invention.
Figure 15:
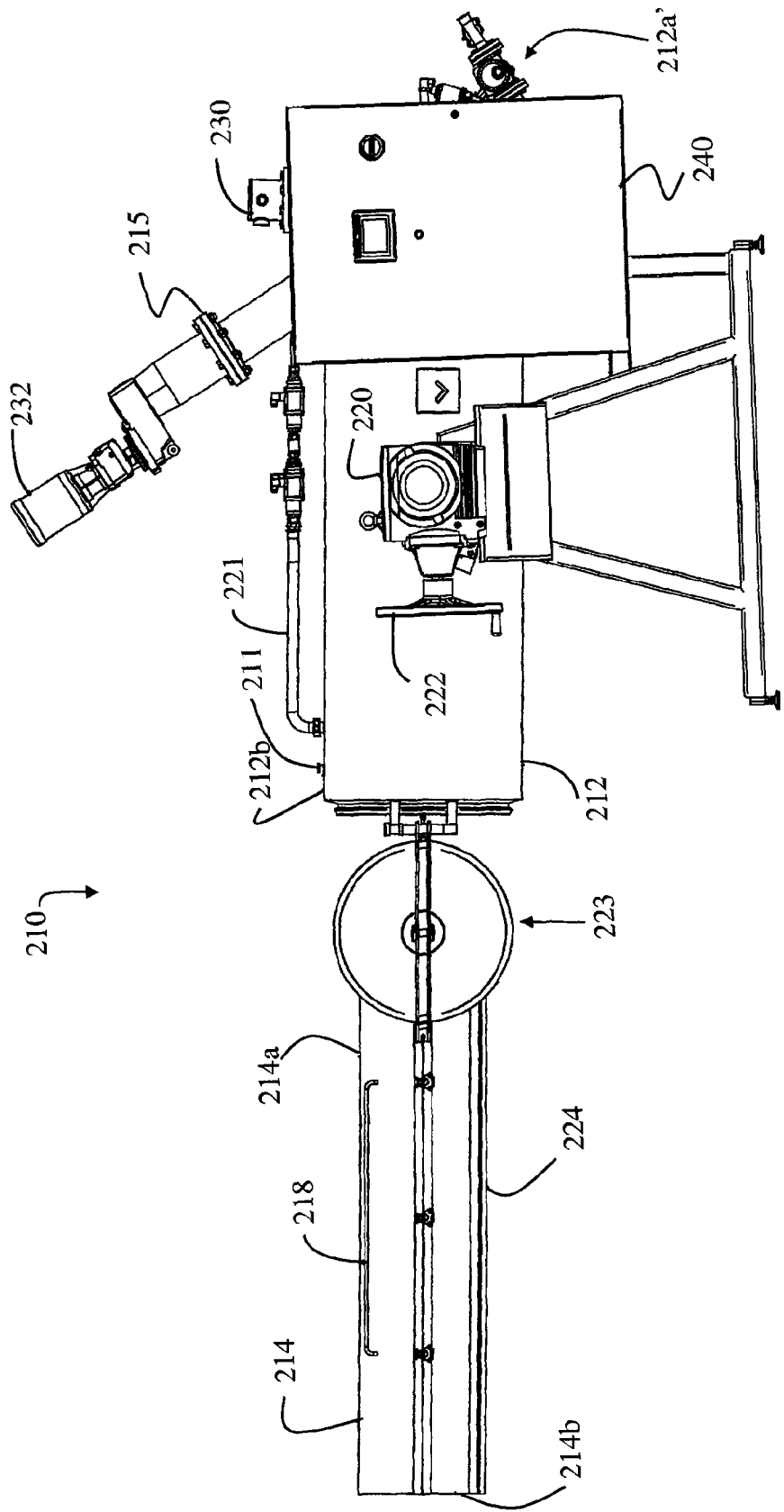
FIG. 15 is a side elevational view of the tissue digester assembly depicted in FIG. 14.
Figure 16:
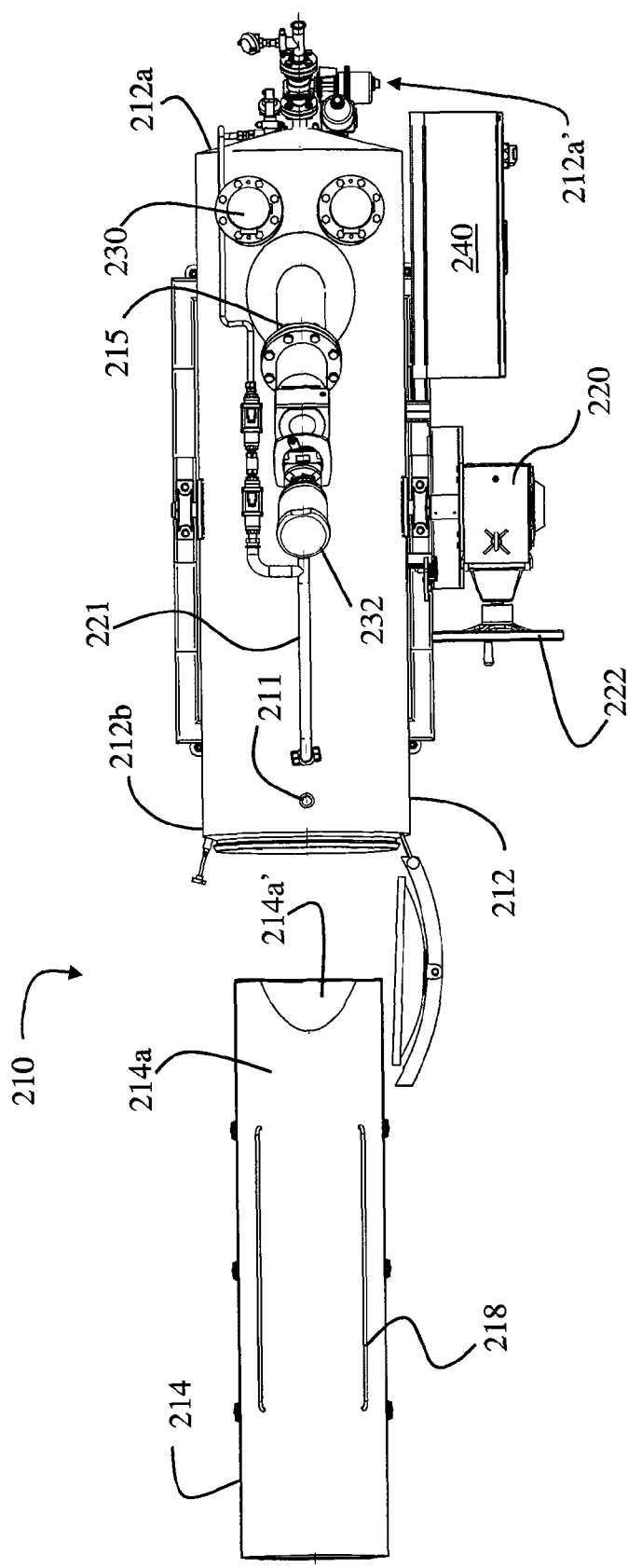
FIG. 16 is a top plan view of the tissue digester assembly depicted in FIG. 14.
Figure 17:
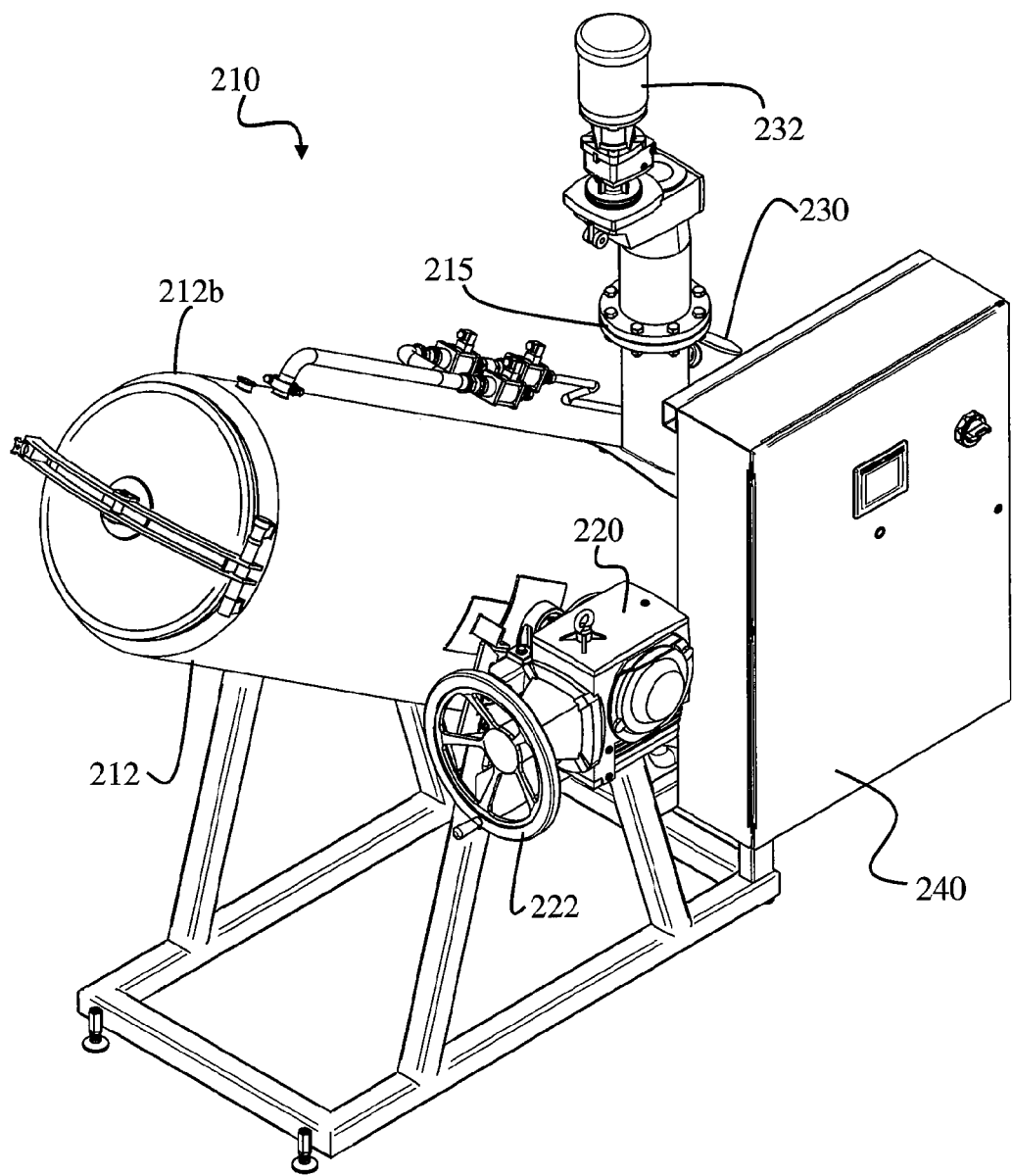
FIG. 17 is a perspective view of the tissue digester assembly depicted in FIG. 14 with the cover closed and the tissue digester assembly tilted to a tissue-digesting position.

The vessel 12 is then closed and door 16 secured. FIGS. 11, 12 and 13 show details of the door 16 and the cross arm assembly 16a, which cooperate to securely shut and keep door 16 closed. Once door 16 is secured, vessel 12 is tipped or tilted with the door 16 facing upwardly and the closed end 12a of vessel 12 facing downwardly as shown in FIGS. 8 and 9 (for clarity, heating and mixing units are not shown in FIG. 8 or 9) in order for the digestion cycle to proceed. In this titled position, door 16 is not exposed to any digestive liquid. Vessel 12 can be moved into the tilted position by either by a powered device, such as an electric gear motor 20, or manually, such as by way of crank handle 22.

Figure 10:
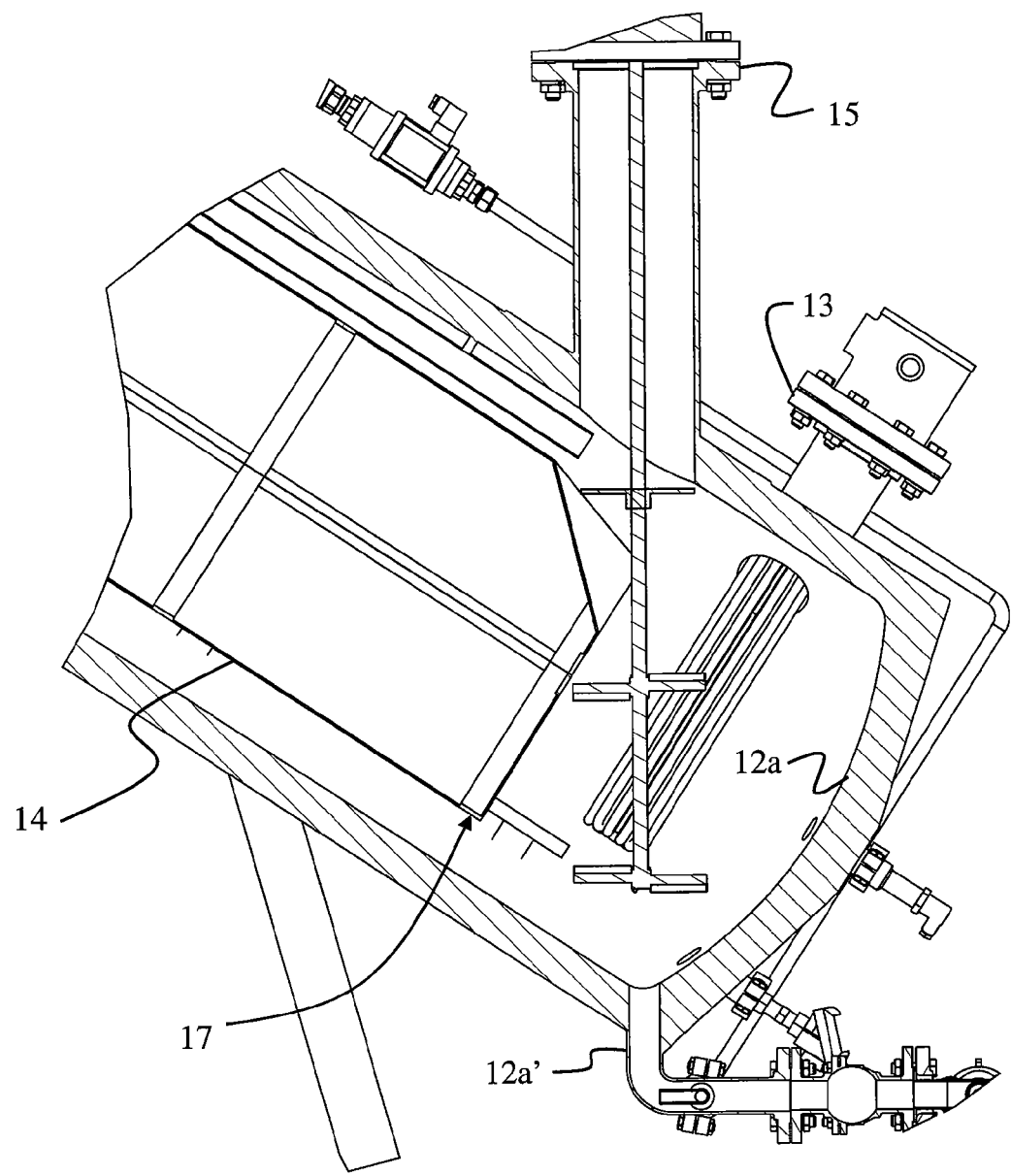
FIG. 10 is a partial cross-sectional view of the tissue digester assembly depicted in FIG. 9 taken along line A-A.
Figure 11A:
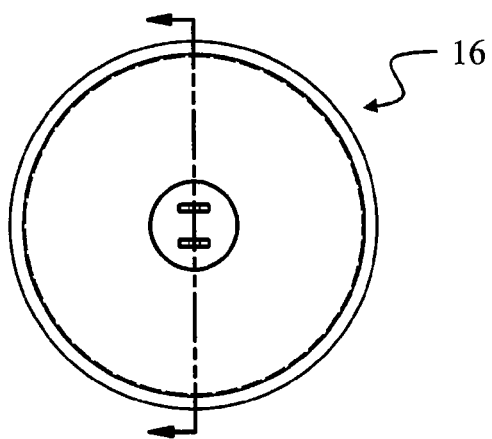
FIGS. 11A-11D present elevational, plan and sectional views of the cover assembly depicted in FIG. 1.
Figure 11D:
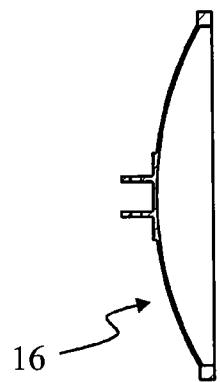
Figure 11B:
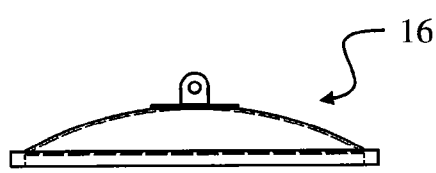
Figure 11C:
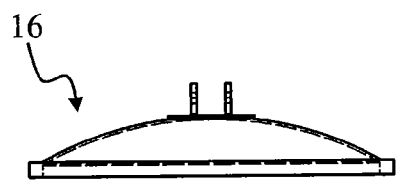

FIGS. 8-10 depict tissue digester assembly 10 tilted into a tissue-digesting position, as compared to FIG. 1 in which the tissue digester assembly is oriented substantially horizontally in a tissue-loading position. FIG. 10 presents a cross-section of the vessel shown in FIG. 8 in its angled position with no heating or mixing apparatuses inserted through ports 13 and 15 for clarity. Basket 14 is shown arranged within the interior of the vessel. A drain or discharge valve 12a' for removing liquid from vessel 12 is preferably provided in closed end 12a of vessel 12.

When the vessel reaches its desired angle, which in one preferred embodiment is with open end 12 raised 10-90 degrees from horizontal, in another more preferred embodiment is with open end 12 raised 30 to 75 degrees from horizontal, and still another most preferred embodiment with open end 12 raised 33 to 38 degrees from horizontal, water (preferably hot water) is then introduced into the interior volume of the vessel through conventional means, such as interior piping and/or a spray bar, for example spray bar 21 (see FIG. 2). When in the tilted tissue digesting position, the vessel is preferably held steady, or the vessel may optionally be rocked (oscillated) to assist in digestion.

In one embodiment, the hot water is introduced so that it rinses all alkali from the interior side of door 16 and flushes the alkali down to the bottom of the vessel 12 once the vessel 12 is in the tilted position. After the digestion process is complete, the water spray can also be employed to wash down the interior of vessel 12, the basket 14 and the contents of basket 14 (bone remnants) to finish the rinsing process. In a preferred embodiment, the jets of the spray nozzle are positioned advantageously to accomplish both the initial cycle flushing and the terminal cycle rinsing functions. The tilted position of the vessel allows for proper application of the water spray for both initial cycle preparation and end-of-cycle rinsing. In a tissue digester capable of handling up to 350 pounds of tissue, the desired volume of water is preferably around 50 to 80 gallons (200 to 300 liters) depending on the amount of animal tissue or the size of the cadaver(s). As a rule, the preferred ratio of water to tissue is 1.5 to 1 but may range from 8 to 1 for very small tissue or bodies to 1 to 1 for very large tissue or bodies; the ratios being selected by the weight of the tissue to be processed. Systems of this invention are offered in different sizes to best fit the intended normal range of bodies or carcasses to be digested. This is considerably less than the amount of water consumed by traditional digestion systems. A device, such as a pressure switch, may be used to determine the interior water level. Other devices, such as weight scales or level sensing devices, may also be used to determine the weight of the contents, which has benefits when the digestion process is controlled at least in part based on the weight of the contents. When the vessel is in the tilted digestion position, the water can range, for example, from a minimum depth of about 24 inches to a maximum of about 48 inches deep.

Any human cadaver or animal tissue tends to reduce the temperature of the water initially, but the alkali and water combine to undergo an exothermic reaction, which offsets the cooling of the water. The process is started with the water at a temperature preferably around 150 degrees F. (65° C.) after the cadaver or tissue and alkali are introduced into the interior of the vessel.

If it is desired to further heat the liquid within the vessel 12, one or more heating units 30 (rated preferably at 10-15 kW each) may be arranged to extend into the interior of the vessel 12 and into and beneath the surface of the interior liquid when the vessel is in its digestion-cycle position (angled or tilted). In certain embodiments, heater 30 includes either an electric or a steam coil. Preferably, two such heaters are used, in which case experimentation has shown that after about 25 minutes the desired temperature is reached. In one preferred embodiment, the desired temperature is 200 degrees F. (93° C.), which is considerably cooler than the temperature at which conventional tissue digesting systems operate, resulting in lower energy consumption and operational cost savings over traditional systems. During the heating of the liquid in this initial phase of the cycle (approximately 25 minutes), digestion begins to occur during this initial stage at temperatures of around 150 degrees F. (65° C.), thereby reducing the total cycle time required for complete digestion of the tissue. In another embodiment vessel 12 may be a pressure vessel (such as one meeting ASME standards), in which case the temperature can be elevated up to over 302 degrees F. (150 degrees C.) to enable even more rapid digestion of the tissue and shorter cycle times.

Embodiments of the present invention are optionally operated at reduced pressure or at elevated pressure depending on the design temperature of the process. For example, many embodiments operate at or near atmospheric pressure. This reduces many dangers associated with pressurized tissue digesters, such as the likelihood of explosion and/or the explosive release of corrosive liquid. Because of the lower pressures, the components of the tissue digester 10 need not be as heavy or thick as components used with pressurized tissue digesters, which lowers manufacturing costs and the overall complexity of the system. Additionally, embodiments operating at atmospheric pressure (frequently referred to as "zero pressure") do not require pressure regulating components. Many conventional pressurized tissue digesters use heat to increase the pressure within the digester. As such, embodiments operated at or near atmospheric pressure realize an energy savings since they do not need to heat the digestive fluid up sufficiently to pressurize the digester. Nevertheless, other embodiments are adapted for and operated at high temperatures and/or pressures to digest tissue as rapidly as possible, although the cost and energy savings may not be realized.

As shown in FIG. 10, when the vessel 12 is in its angled (tilted) or digestive cycle position, mixer 32 is preferably positioned substantially vertically (no more than 10 degrees from vertical in one embodiment with one or more propellers arranged along the shaft providing agitation to and mixing of the interior contents of the vessel. This angled positioning of the vessel 12 allows for substantially more aggressive agitation and mixing of the liquid and contents of the basket 14. While it is preferred that mixer 32 be arranged substantially vertically when in the tilted position, this invention can operate at any tilt angle. During the digestive cycle as the tissue is dissolved or removed from the bone remnants, the completeness of the digestion is enhanced dramatically by the fact that such fragments and remnants eventually slide and/or fall downwardly to the bottom of the angled basket 14, much closer to the agitator, thus expediting the digestive process.

Once the digestive cycle has been completed, the liquid within vessel 12 can be drained through drain 12a' and, after a rinse cycle, the vessel may be returned to a horizontal, substantially horizontal or inclined position as appropriate for removal of the basket. The vessel door may then be opened and the basket removed. The digestion cycle may be selected such that no tissue is left at the end of the cycle. As noted above, agitation works well in allowing access of the alkali to all tissue particulars and fragments during the digestive process. Experience has shown that any bony material that might remain after the digestion cycle is completed consists entirely of demineralized "bone shadows" that are devoid of protein and that literally crumble between one's fingers. Any bones left within the basket are sterile and may be readily scooped into a waste container for final disposal or, for example, dried and ground to be presented in an urn for the family of the deceased.

Depicted in FIGS. 14-17 is a tissue digester assembly 210 according to another embodiment of the present invention, which is similar to tissue digester 10 in construction and operation unless otherwise indicated. Tissue digester assembly 210 includes a vessel 212 and a cage or basket 214 arranged removably within vessel 212. Vessel 212 includes a liquid holding end 212a and a tissue insertion end 212b. Although the depiction of basket 214 in FIGS. 14-17 do not show perforations, it is to be understood that basket 214 includes one or more perforations through which the digestive liquid can flow. In one embodiment, basket 214 contains multiple perforations and resembles a wire cage.

As shown in FIGS. 18A-18D, basket 214 includes upper lid portion 214a and bottom portion 214b. The end of basket 214 which is enclosed by the digesting end of vessel 212 (closed end 212a of vessel 212 in the illustrated embodiment) is closed to prevent pieces of tissue larger than the perforations from circulating outside basket 214 and preferably includes a concave portion 214a' to provide clearance internal devices, such as mixer 232. The end of basket 214 which is enclosed by the other end of vessel 214 (open end 212b of vessel 212 in the illustrated embodiment) optionally includes an open portion 219 through which alkali may be inserted.

Basket 214 is optionally provided with loading members, for example rails 224, that facilitate the basket being moved into and removed from the interior of the vessel 212. The loading members can also serve to space basket 214 a selected distance from the interior sides of vessel 212 in order to facilitate flow of the digestive fluid around and through basket 214 when basket 214 is inserted into vessel 212. Basket 214 also preferably includes handles 218, which assist with the moving upper lid portion 214a either with or without bottom portion 214b attached. Handles 218 can also assist in maintaining separation between basket 214 and the internal sides of vessel 212.

Vessel 212 includes two ports 213 arranged adjacent the end 212a of vessel 212. Through each port 213 a heating unit 230 optionally extends into the interior of vessel 212. A port 215 is also provided adjacent the closed end 212a of the vessel to optionally carry a mixing unit 232, which includes a shaft extending downwardly into the interior of vessel 212 similar to the mixing unit 32 depicted in FIGS. 6 and 10. Heating units 230 extend downward from the top of vessel 212, which assists in keeping solid residues from forming around the bases of heating units 230 and possibly leading to the premature failure (i.e., burn out) of heating units 230. In the example tissue-digesting orientation depicted in FIG. 17, mixing unit 232 extends substantially vertically downward, which reduces loads perpendicular to the longitudinal axis of the shaft, thereby reducing wear and tear on the shaft and its bearings.

Vessel 212 also includes a removal system 212a', through which the fluid is removed from vessel 212. Removal system 212a' can include a drain valve, a thermocouple and/or a $CO_2$ valve for introducing $CO_2$ into the vessel and lowering the pH prior to draining the fluid.

Vessel 212 is supported upon a support member and optionally pivots or tilts with respect to the support member and may be moved into a titled position by way of gear box 220, which may be electric-powered or operated manually via turn handle 222.

Tissue digester assembly 210 is preferably controlled by controller 240, which may take the form of various controllers known in the art, such as a programmable logic controller.

Vessel 212 optionally includes pressure port 211 (similar to pressure port 11 in FIG. 2), which relieves pressure that may build as the fluid in vessel 212 is heated and maintains the interior of vessel 212 at or near atmospheric pressure. Pressure port 211 may be connected via a hose or vent line to the exterior of the building if desired. In other embodiments, the door assembly 223 is a low pressure device and configured to prevent the buildup of excessive pressure. For example, in one embodiment door assembly 223 begins to release pressure once pressure within vessel 212 increases to more than five (5) psi above atmospheric. When vessel 212 is in a tilted orientation, the fluid level will be below the door and no fluid will escape when door assembly 223 releases pressure. Still further embodiments include a dual-redundant pressure relief system with both a pressure port 211 and a low pressure door assembly for added safety in case one pressure relief device unexpectedly fails.

Prior systems operating horizontally or vertically have not been successful in rapidly agitating the final remnants of tissue. One detrimental issue in certain prior systems is that they frequently have baskets with substantially flat bottoms, which allow bone fragments and/or bone powder to cover the tissue in areas where there is little or no agitation, thereby protecting the tissue from further hydrolysis (digestion), hampering and slowing the digestive process. Tilting the basket and having the lower portion of the tilted basket form a non-flat collection area funnels tissue too large to pass through the holes/perforations in the basket to a localized collection area where the bone fragments, and tissue, collect. For example, when basket 14 (or 214) is tilted to the tissue-digesting orientation, tissue travels along the sloped sides of basket 14 (or 214) to a valley region, for example collection area 17 (or 217), where the tissue collects. See FIGS. 1, 2, 4B, and 10 (or FIG. 18C). The collection area 17 (or 217) at the end of basket 14 (or 214) is positioned in close proximity to the agitation apparatus to reduce (and potentially eliminate) the likelihood that bone fragments or bone powder will cover the tissue. The increased agitation of digestive fluid near the agitator decreases the likelihood of bone fragments or bone powder covering the undigested tissue and increases the exposure of the tissue to the digestive fluid, thereby facilitating complete digestion of the tissue. In certain embodiments the agitators are sufficiently close to the tissue to permit less vigorous operation of the agitators while still obtaining quick digestion of the tissue, thereby saving energy and operating costs.

Figure 3A:
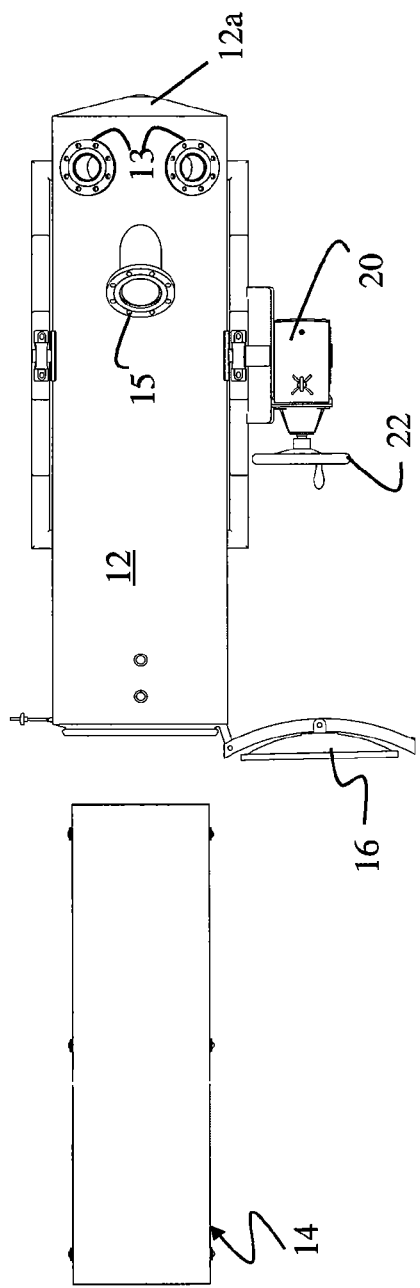
FIG. 3A is a top plan view of the tissue digester assembly depicted in FIG. 1.
Figure 3B:
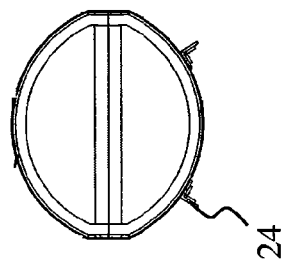
FIG. 3B is a sectional view of the basket assembly portion of the tissue digester assembly depicted in FIG. 1 taken along line A-A of FIG. 3A.

The dispersion of bone fragments over a wide area frequently occurs with the substantially flat-bottomed baskets of prior systems, which is of particular significance in the mortuary setting since it can also make collection of the bone fragments difficult. Embodiments of the present invention with non-flat bottom baskets, for example bottom portion 14b (or 214b) of basket 14 (or 214) is curved as depicted in FIGS. 1, 3B, and 6 (or FIGS. 14 and 18D), address this issue by presenting a surface that slopes and funnels tissue too large to pass through the holes/perforations in the basket toward the center of the basket's bottom portion 14b (or 214b) making it easier to collect. In some embodiments, a substantial portion of the entire length (and/or height) of the basket slopes toward a collection area. In the illustrated embodiment, the entire length of basket 14 is sloped. Tilting the basket also assists in funneling the bone fragments to a small area, for example, collection area 17, making collection of the bone fragments relatively easy.

Another benefit of angling the digestion vessel is that the liquid level in the vessel is substantially deeper than it would be in a horizontal configuration, thus allowing more aggressive agitation without picking up aeration from the surface of the liquid volume. The surface area of the digestive liquid is also decreased as the vessel is tilted from the tissue-loading horizontal orientation to the tissue-digesting tilted orientation. These features reduce or eliminate the amount of foam formed from the soap produced as the fats are digested in the process—the formation of foam is detrimental to the digestion process and a common problem in horizontally configured conventional tissue-digestion systems While the preferred mixing units can include circulation pumps, this invention most preferably includes a directly driven or magnetically coupled propeller-driven mixer. A propeller-driven mixer increases up-time and eliminates pump-related and seal-related failures, which are common problems with circulation pumps and the submerged pump seals used in many tissue digestion systems. The propeller can preferably be driven at varying speeds and in opposite directions to yield a highly agitated process during the digestion cycle. Such a high level of agitation taking place in combination with the angled configuration of the vessel during the digestion portion of the cycle enhances the digestive process significantly.

Although cold water may be used to fill the digestion vessel, such as through piping 221, cold water will typically lengthen the digestion cycle. For example, in the event the process starts at a relatively cold temperature, for example, at around 70 degrees F. (25° C.), it could take over 1 hour for two 15 kW heaters (30 kW total) to reach the desired temperature, resulting in the digestion cycle taking approximately 30 minutes longer than if hot water were used initially. Thus, it is advantageous to feed the unit with hot water to accelerate the initial heat-up stage. Obviously, the hotter the initial water, the faster the digestion occurs and the shorter time necessary to reach the desired temperature for the digestion cycle. Alternatively, heating units rated at more than 30 kW total may also be used. Hot water can also be beneficial for the rinse cycle, as hot water can help speed the process by shortening the rinsing cycle time.

During the development of this invention, it was discovered that complete digestion of animal carcasses and/or human cadavers (down to very small peptide sizings) occurs at about 6-12 hours when the liquid is heated to approximately 200 degrees F. (93° C.), but that the animal carcasses and/or animal cadavers will be liquefied earlier in the process. Agitation is preferably used to accelerate the digestive cycle, and is particularly useful toward the end of the digestive cycle when the bones have fallen downward within the basket and are positioned closer to the propeller of the mixer. Alternate embodiments include interior baffling within the digestion vessel to facilitate this agitation process.

Embodiments of the preferred tissue digester of this invention require a single or 3-phase power source in the range of 200-480 volts depending on the country in which the system is installed and its available power. The relatively low power requirements allow the tissue digester to be connected to the standard electrical breaker box normally found in most modern business sites, thereby eliminating the need to modify a building's electrical system for industrial electrical loads As an alternative heat source contemplated by the invention, a heat exchanger and a boiler may be employed to provide a circulatory heating system to heat the interior of the digestion vessel. The system of this invention also preferably includes a programmable logic controller (PLC) to monitor the operation of the system and to optionally generate an alarm if there is a malfunction, such as a failed heater or mixing unit.

Embodiments of the present invention digest tissue much faster than the prior systems. For example, when operated at similar temperatures and pressures as prior devices, embodiments of this invention can agitate the affluent with minimal or no aeration, maintain the tissue near the agitation device where there is increased agitation, and digest tissue in approximately one-half the time of prior systems.

Although the vessels in illustrated embodiments are generally depicted as tilting from a tissue loading position to a tissue digesting position, other embodiments of the present invention include vessels oriented at a fixed tilted position (non-horizontal and non-vertical orientation) with the tissue loading position and the tissue digesting positions being oriented at the same or substantially the same tilt angle.

When tested, the preferred embodiments of the present invention achieved digestion results that were, surprisingly, as good as more complicated systems using higher temperatures and pressures. For example, the homogeneous consistency of the hydrolysates resulting from operating embodiments of the present invention for 18 hours at about 95° C. (203 degrees F.) and atmospheric pressure were surprisingly as effective in completely digesting proteins as hyperbaric systems. Independent amino acid and peptide analyses of hydolysates further confirmed the surprisingly complete nature of the hydrolysis achieved by embodiments of the present invention operating at low temperature and low pressure.

As an example of an independent experiment of the low temperature alkaline hydrolysis process employed by one preferred embodiment of this invention, 2,300 pounds of animal tissue were introduced in a non-pressurized horizontal vessel with an open top, after which 90% anhydrous KOH was added in dry flake form (approximately 255 pounds (11% of the tissue weight)). The temperature was recorded and tissue samples extracted at certain intervals as follows:

t=1 hour: 172 degrees F.
t=4 hours: 192 degrees F.
t=8 hours: ≤200 degrees F.
t=17 hours: ≤200 degrees F.
t=18 hours: ≤200 degrees F.

The peptides size existing in the tissue samples was analyzed by Matrix-Assisted Laser Desorption/Ionization technique ("MALDI"). MS spectra were run for all four (4) analyzed samples in positive reflector mode using alpha-cyano-4-hydroxycinnamic acid as a matrix. The samples were diluted and purified with C18 zip tip before being spotted on a MALDI plate. Samples were mixed 1:1 with the matrix solution on plate. The instrument used was a MALDI 4800TOF/TOF Analyzer available from Applied Biosystems, Inc. MS spectra were run in a range of 800-4000, and the highest masses observed were about 2800. Amino acid masses varied from 57 up to 186—the average for this kind of estimation is 110-120—which suggests there is a little more than 20 residues for the highest fragments.

Such results confirm the homogeneous consistency of the resulting hydrolysates, in addition to confirming (via the independent amino acid and peptide analyses of the hydolysates) the complete nature of the hydrolysis achieved by this process.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. A method, comprising:
   loading tissue into a tissue digester;
   tilting the tissue digester with the tissue loaded therewithin approximately 10 degrees to approximately 90 degrees from horizontal; and
   digesting the tissue after said tilting.

2. The method of claim 1, wherein said step of loading tissue into a tissue digester includes the steps of:
   loading tissue into a perforated tissue-containing member; and
   horizontally loading said perforated member into said tissue digester.

3. The method of claim 2, further comprising the steps of:
   tilting the tissue digester after said digesting step back to a substantially horizontal position; and removing said perforated member from said tissue digester.

4. The method of claim 1, wherein said step of digesting the tissue after tilting includes the steps of:
   maintaining the temperature of the digestive fluid at no more than 210 degrees F.; and
   maintaining the pressure within the tissue digester at atmospheric pressure.

5. The method of claim 4, wherein said step of maintaining the temperature of the digestive fluid at no more than 210 degrees F. includes the step of disposing a heating element within the digestive fluid.

6. The method of claim 1, wherein said step of digesting the tissue after tilting includes the step of maintaining the temperature of the digestive fluid at approximately 300 degrees F.

7. The method of claim 6 further comprising the step of maintaining the pressure within the tissue digester at approximately 65 psi.

8. The method of claim 6, wherein said step of maintaining the temperature of the digestive fluid at approximately 300 degrees F. includes the step of disposing a heating element within the digestive fluid.

9. The method of claim 1, further comprising the step of agitating the digestive fluid with a mixing means.

10. The method of claim 9, wherein said mixing means is defined by a propeller disposed within the digestive fluid.

11. The method of claim 1, further comprising rocking the tissue digester after said tilting.

* * * * *